Aug. 21, 1956 G. KEGELES 2,759,814
METHOD AND APPARATUS FOR PRODUCING CONTOURED PHOTOGRAPHS
Filed April 27, 1953

INVENTOR
GERSON KEGELES

BY Scrivener & Parker
ATTORNEYS

United States Patent Office 2,759,814
Patented Aug. 21, 1956

2,759,814

METHOD AND APPARATUS FOR PRODUCING CONTOURED PHOTOGRAPHS

Gerson Kegeles, Worcester, Mass.

Application April 27, 1953, Serial No. 351,211

4 Claims. (Cl. 95—5)

The present invention relates to photography and more particularly to a novel method and apparatus for producing contour photographs of irregular surfaces.

Heretofore in the art of contour photography and particularly in the field of aerial mapping, contours on the object photographed have been produced only after performing a multitude of time consuming steps which usually involve the taking of a plurality of photographs simultaneously. For example, in the field of aerial mapping it has been the custom to produce stereoscopic photographic views of the region to be mapped and stereoscopically estimating thereon points of the terrain having equal elevation. Lines drawn through these points at fixed increments of elevation are termed contour lines and are utilized in producing topographic maps. This method of producing contour lines involves many steps which do not assure accurate results and usually involves a vast amount of expensive equipment.

It is accordingly one of the objects for the present invention to provide an apparatus and method of producing contoured photographs which eliminate the disadvantages of present systems of contour photography.

Another object of the invention is to provide a novel method and apparatus for aerial mapping.

Yet another object of the invention is to provide a method and apparatus for photographing irregular surfaces while simultaneously producing elevational contour lines thereon in a single operation.

Still another object is to provide a method and apparatus for producing elevational contours on irregular objects wherein only one photograph need be taken of the object.

Yet another object is to provide a method and apparatus for accomplishing the above which is relatively inexpensive, simple in operation and productive of more accurate results than heretofore achieved in the field of contour photography.

Other objects and novel features of the invention will appear more fully hereinafter from the following detailed description when read in conjunction with the accompanying drawings. It will be expressly understood, however, that the drawings are employed for purposes of illustration only and are not designed as a definition of the limits of the invention, reference being had for this purpose to the appended claims.

Referring to the drawings, wherein similar reference characters refer to similar parts throughout:

Figure 1:
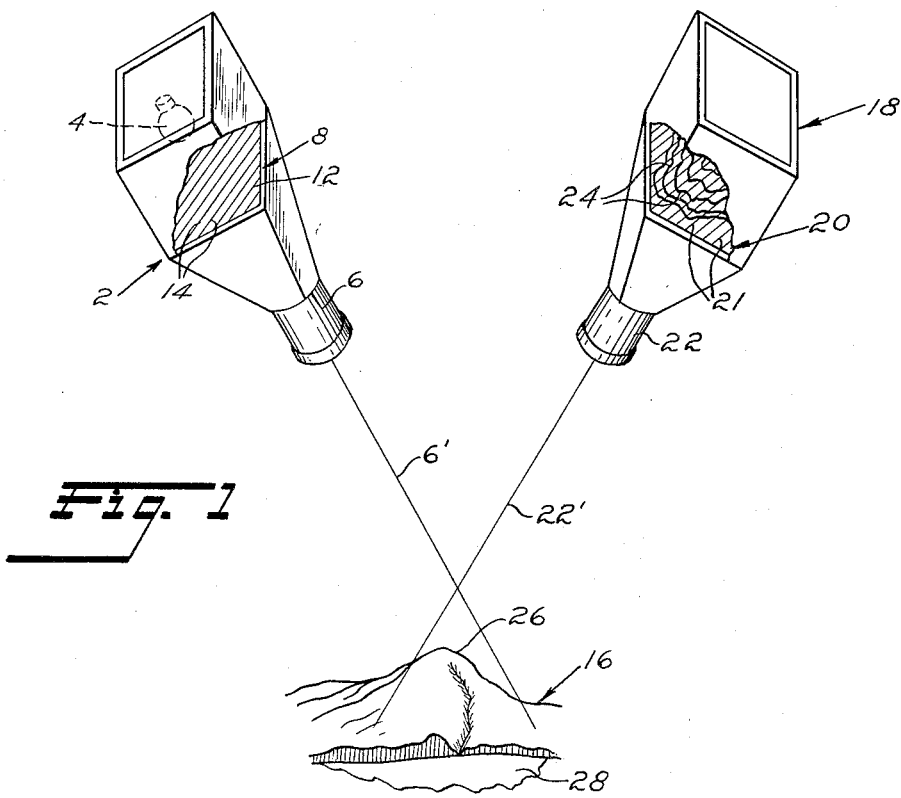
Fig. 1 is a diagrammatic view showing the apparatus employed in the present invention as it may be utilized for aerial contour mapping of a portion of terrain.
Figure 3:
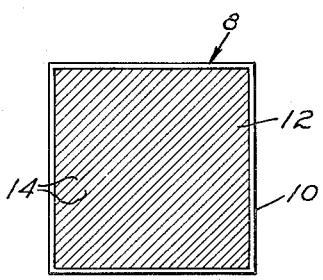
Fig. 3 is a detailed view of a screen which may be employed with the apparatus illustrated in Fig. 1.

Referring more particularly to Fig. 1, the apparatus of the present invention is illustrated therein as comprising a projector 2 having a powerful light source 4 therein. Mounted between the light source 4 and the lens 6 of the projector is a screen or grid 8 more particularly illustrated in Fig. 3. As shown, grid 8 may comprise a frame 10 having therein a sheet 12 comprising any one of a variety of suitable materials such as glass, plastic or the like on which are a plurality of equally spaced parallel fine grid lines 14 disposed at an appreciable angle with respect to the line joining the camera and projector lens.

It will be apparent that when light source 4 is illuminated and lens 6 is properly focused, a series of spaced parallel lines will be projected on the object to be photographed which may be of any shape and at any desired distance from the projector. The object 16 illustrated is a portion of terrain and the projector may be assumed to be suitably mounted in an aircraft engaged in topographic mapping operations. It should be understood that when photographing geographic terrain the external light condition must be such that it does not appreciably interfere with the casting of the lines on the region to be mapped. For photographing smaller objects located indoors, for which my invention is equally adapted, external light sources are readily excluded so that light interference problems do not ordinarily exist.

Associated with projector 2 but laterally spaced therefrom and disposed in a substantial angular relationship thereto is a camera 18 containing a grid 20 located directly in front of and parallel to the camera's focal plane. Grid 20 may be constructed similarly to grid 8 and reference is herewith made to the description thereof for a description of grid 20. When the projector and camera are disposed in position for contour photography it is necessary that the grid lines 14 of the projector grid 8 be parallel to the camera grid lines 21 and since one of the features of my invention resides in substantial angularity existing between the respective optical axes of the projector and the camera it will be apparent that in order to achieve this parallelism a variation in the angular disposition of the grid lines on the separate grids may be necessary or means (not shown) may be provided for rotating one grid with respect to the other until parallelism is achieved.

The camera 18 is spaced laterally from the projector 2 a sufficient distance so that when it is aimed at the region covered by the lines emanating from the projector 2 a substantial converging angle exists between the respective optical axes 22' and 6' of the camera and projector. In aerial mapping, for example, this requirement may be met by mounting the projector and camera on opposite wings of an aircraft. Furthermore, the camera lens 22 is of such magnification that the image in the camera of the projected grid lines as reflected from the region or surface to be photographed has the same grid line spacing as the lines 21 of the grid 20 in front of the camera's focal plane. That is to say, were the grid lines from the projector 2 to be cast on a plane surface normal to the line bisecting the angle between the optical axis of projector and camera the reflected image of the projected grid lines at the camera's focal plane should be so superimposed upon the grid lines 21 of camera grid 20 that both sets of grid lines would be in registry and appear as one. Furthermore, when so projected the lines must be in a substantially angular relationship with an imaginary line joining the respective projector and camera lenses 6 and 22.

When an object having an irregular surface such as the geographical terrain 16 illustrated in Fig. 1 is to be contour photographed in accordance with the invention, the lines projected on the terrain by projector 2 would appear, as viewed from the camera, distorted in direct relation with the surface variation of the area to be photographed.

Figure 2:
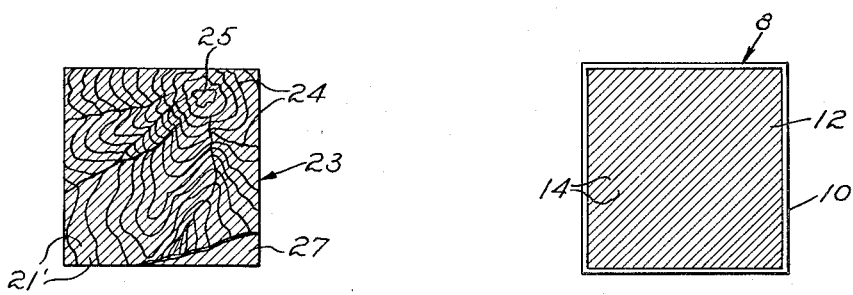
Fig. 2 is a view of a photograph of the terrain illustrated in Fig. 1.

When the image of these distorted lines is superimposed on the identical but undistorted lines 21 of camera grid 20, which may be referred to as a reference grid, there appears on the focal plane of the camera and superimposed on the image of the region to be photographed, a series of concentrically disposed irregular lines 24 as shown in Fig. 1 and more particularly in Fig. 2. Upon photographing the area and inspecting the resulting negative such as negative 23 in Fig. 2, it will be found that each of the lines 24 represents the locus of all points having equal elevation and that the spacing between one line and the next represents equal rise or drop in elevation. Thus true contour lines are reproduced on the photograph of the region or surface. As shown, the fine lines 21 of the reference grid 20 will also appear on the negative as the fine lines 21 but because the line spacing thereof is so much less than that of the contour lines 24 each type of line is readily distinguished from the other and no confusion results.

The contour line spacing and elevations represented thereby are functions of the angle between the line joining projector and camera lenses and the grid line projections in a horizontal plane, as well as of the angle between optical axes of projector and camera and of grid line spacing in the projector and camera and thus the contours may be varied to represent a fixed number of units depending upon whether the object to be contoured is large, such as a portion of the earth's surface, or is relatively small. In Fig. 2, the region or area 25 represents the summit 26 of the terrain in Fig. 1. The area 27 in Fig. 2 represents a water area 28 fronting the terrain of Fig. 1 and being a plane surface does not produce contour lines. The unit interval of elevation once having been established for the contours, it is then a relatively simple matter for one skilled in map-making to transfer the contours directly to a topographical map.

It should be understood that the screens 8 and 20 may be so constructed that the grid lines 14 and 21 respectively thereof filter light to produce either a series of fine equally-spaced parallel dark lines on a substantially lighted field, or a series of fine equally-spaced parallel lines of light on a substantially dark field. When the former system is used in accordance with this invention, a positive print of a photographic view of an irregular object would disclose dark contour lines on the surface thereof whereas the latter system would produce dark contour lines on the photographic negative. It may also be desirable to employ grids in which the light and dark lines are of equal thickness, in which case the distinction between positive and negative contour photographs loses its significance.

While this invention has been particularly described in connection with aerial photography of geographical terrain, it will be understood that the same is equally adaptable to contour photography of any object of irregular shape. Moreover, while one embodiment of the invention and method of employing the same has been illustrated and described herein, it will be understood that the same is not limited to this embodiment and method, but is capable of a variety of expressions, as will readily appear to those skilled in the art, without departing from the spirit of the invention. Reference will therefore be made to the appended claims for a definition of the limits of the invention.

What is claimed is:

1. Apparatus for producing contour lines on photographs of irregular surfaces comprising a supporting surface, a light projector mounted on said supporting surface, a screen for said projector having a plurality of equally spaced parallel fine grid lines disposed thereon, a camera laterally spaced from said projector and mounted on said supporting surface, said projector and camera being disposed in substantial converging angular relationship, a second screen disposed within the camera and being mounted in front of the focal plane thereof, said second screen having a plurality of equally spaced parallel fine grid lines disposed thereon, said grid lines of said screens having equal spacing and being disposed in parallel relation to each other when in operative position, the angular relationship between said lines being equal, and means for photographing the irregular surface with the grid lines superimposed on the image of the irregular surface to thereby produce contour lines.

2. A method of producing elevational contour lines on a photograph of an irregular surface which comprises, projecting light through a screen provided with a plurality of equally spaced parallel fine grid lines to provide equally spaced parallel light lines, projecting said lines on the irregular surface, superimposing a reflected image of the projected light lines on a second screen mounted in a camera disposed in the same plane but angularly related to the projector, said second screen being provided with a plurality of equally spaced parallel fine grid lines thereon, the spacing between the lines on said screens being equal, disposing said screens so that the fine grid lines of each screen are parallel and photographing the irregular surface through said second screen.

3. A method of producing contour lines on a photograph of an irregular surface which comprises, projecting a predetermined system of markings on said surface by means of a screen having equally spaced parallel fine grid lines thereon, photographing said system of markings from a position in angular relationship to the surface whereby the system of markings is distorted in relation to variations of the surface, and superimposing an undistorted system of markings on the distorted systems of markings by means of a screen having equally spaced, parallel grid lines thereon so arranged that the spacing between the lines of the first named screen is equal to the spacing between the lines of the second named screen, and adjusting the said screens before photographing the surface so that the said grid lines of said two screens are disposed in parallel, angular relationship.

4. Apparatus as set forth in claim 1 comprising, in addition, means for varying the angularity of the screens to place the grids in parallelism.

References Cited in the file of this patent

UNITED STATES PATENTS

| 875,770 | Borzykowski | Jan. 7, 1908 |
| 1,485,493 | Edmunds | Mar. 4, 1924 |
| 1,596,458 | Schiesari | Aug. 17, 1926 |
| 1,716,768 | Edmunds | June 11, 1929 |